United States Patent [19]
Kirikami et al.

[11] Patent Number: 5,144,794
[45] Date of Patent: Sep. 8, 1992

[54] GAS TURBINE ENGINE WITH COOLING OF TURBINE BLADES

[75] Inventors: Seiichi Kirikami; Tomo Satoh; Isao Sato, all of Hitachi; Thutomu Gunzi, Ibaraki; Nobuyuki Iizuka, Hitachi, all of Japan

[73] Assignee: Hitachi, Ltd., Tokyo, Japan

[21] Appl. No.: 561,815

[22] Filed: Aug. 2, 1990

[30] Foreign Application Priority Data
Aug. 25, 1989 [JP] Japan .................................. 1-217361

[51] Int. Cl.$^5$ .............................................. F02C 3/00
[52] U.S. Cl. .............................. 60/39.75; 60/39.161; 415/115
[58] Field of Search ............... 60/39.75, 39.07, 39.161; 415/115; 416/96 R, 97 R

[56] References Cited

U.S. PATENT DOCUMENTS

| | | | |
|---|---|---|---|
| 2,951,337 | 9/1960 | Atkinson et al. | 60/39.161 |
| 3,528,241 | 9/1970 | Venable et al. | 60/39.161 |
| 3,742,706 | 7/1973 | Klompas | 60/39.66 |
| 4,217,755 | 8/1980 | Williams | 60/39.75 |
| 4,466,239 | 8/1984 | Napoli et al. | 60/39.75 |
| 4,648,799 | 3/1987 | Brown et al. | 416/96 R |
| 4,826,397 | 5/1989 | Shook et al. | 60/39.75 |
| 4,882,902 | 11/1989 | Reigel et al. | 415/115 |

FOREIGN PATENT DOCUMENTS

2835903 3/1979 Fed. Rep. of Germany .

Primary Examiner—Richard A. Bertsch
Assistant Examiner—Michael I. Kocharov
Attorney, Agent, or Firm—Antonelli, Terry, Stout & Kraus

[57] ABSTRACT

A gas turbine includes a cooling air supply device for supplying compressed cooling air to moving blades, and a heat exchanger provided in the cooling air supply device for cooling the compressed cooling air. Compressed air withdrawn at an intermediate-stage portion of a compressor is used as a cooling medium for the heat exchanger. With this construction, the moving blades can be sufficiently cooled without the use of any special cooling medium.

5 Claims, 9 Drawing Sheets

GAS TURBINE ENGINE WITH COOLING OF TURBINE BLADES

BACKGROUND OF THE INVENTION

This invention relates to an improvement in a gas turbine, and more particularly to an improved gas turbine of the type in which part of compressed air for combustion is used as cooling air for cooling moving blades.

In a conventional gas turbine of this general type as disclosed in Japanese Patent Unexamined Publications Nos. 57-26206, 1-83827 and 48-87212 and Japanese Utility Model Unexamined Publication No. 64-8504 usually, part of compressed air for combustion is withdrawn, and moving blades are cooled by the withdrawn air. This construction will now be described more specifically with reference to FIGS. 4 and 5. The gas turbine broadly comprises a combustor 1A disposed on the stationary side, a compressor 2A for producing compressed air which is used in the combustor 1A, and a turbine 3A driven by combustion gas from the combustor 1A.

Figure 4:
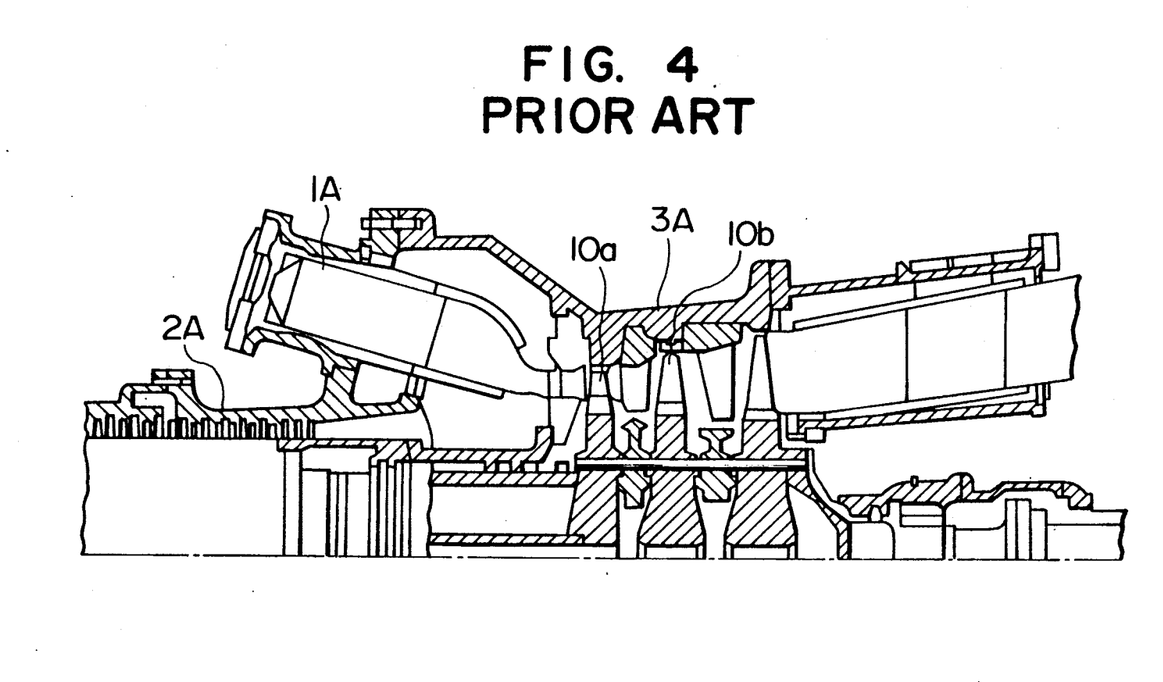
FIG. 4 is a cross-sectional view of an essential part of a conventional gas turbine.
Figure 5:
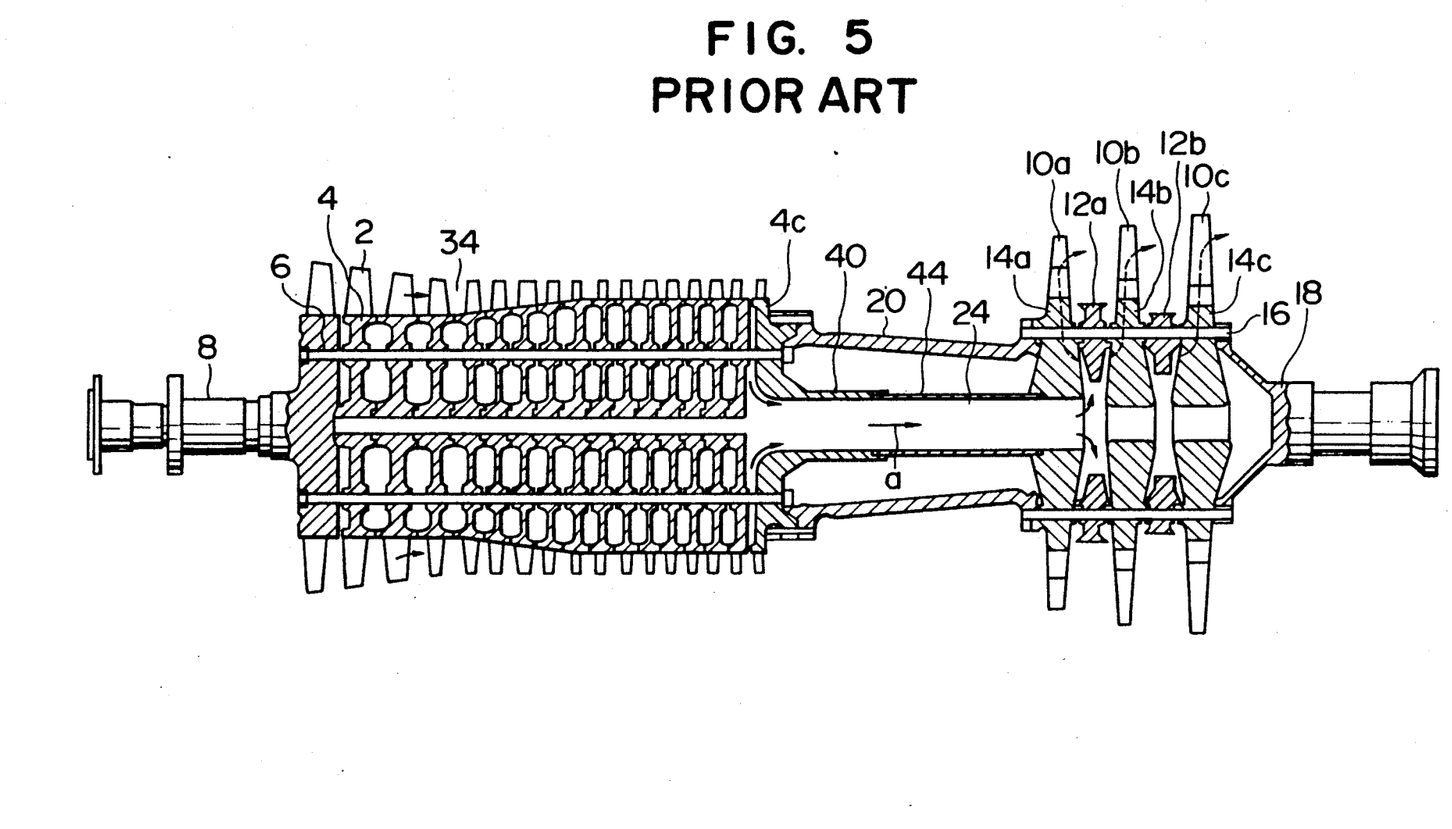
FIG. 5 is a longitudinal cross-sectional view of a rotor of the conventional gas turbine of FIG. 4.

The compressor 2A is driven by the turbine 3A to produce high-pressure air which is supplied as combustion air to the combustor 1A. The combustor 1A causes a chemical reaction between this air and fuel, that is, combusts the fuel. Hot gas (1,100° to 1,400° C.) resulting from the combustion flows into the turbine 3A to perform the work. The work is given in the form of rotary energy, and, for example, it is converted into electric energy if the load is a generator.

First-stage moving blades 10a and second-stage moving blades 10b of the turbine 3A which blades receive the hot combustion gas must be used within the high-temperature strength limits of the material of these moving blades. For this reason, these moving blades are usually cooled by air flowing through an internal bore in a shaft.

Japanese Patent Unexamined Publication No. 60-101202 discloses one example of such cooling method, and more specifically describes return flow-type cooling moving blades, each of which is hollowed so as to have a cavity therein and has therein a turbulence promoter for promoting heat transfer.

In the gas turbine, the air a of high pressure emerging from the outlet of the compressor must be used as cooling air for cooling the first- and second-stage moving blades 10a and 10b of the turbine.

More specifically, this cooling air is finally discharged from the first-stage moving blades into the combustion gas of high pressure via cooling holes in the moving blades. Therefore, it is necessary to use the cooling air of high pressure, emerging from the outlet of the compressor, in order to prevent a reverse flow (i.e., flow from the exterior of the moving blade toward the interior thereof).

The cooling of the moving blades is thus effected by discharging part of the high-pressure air, outputted from the compressor, through many cooling holes formed on the surface of each moving blade thereby resulting in a so-called "shower cooling". In this case, because of such many cooling holes on the surface of the moving blade rotating at high speed, a surface loss is increased, and besides since the high-pressure gas is injected from the cooling holes, this loss is still further increased. More specifically, the combustion gas, when passing past the moving blades, is influenced by the cooling air injected from the cooling holes on the moving blade, that is, the combustion gas is subjected to disturbance resulting in the moving blades suffering a so-called blade profile loss.

If the moving blades can be sufficiently cooled by the cooling gas of a very low temperature, the number of the cooling holes formed on the moving blades can be reduced, and the loss due to these cooling holes is reduced. However, the cooling air for the moving blades must have a high pressure in order to prevent the above-mentioned reverse flow, and the higher the pressure of the cooling air, the higher the temperature thereof. Therefore, in order to sufficiently cool the moving blades, a large amount of cooling air must flow past the moving blades, and it is very difficult to reduce the number of the cooling holes on the surface of the moving blades.

SUMMARY OF THE INVENTION

With the above problems in view, it is an object of this invention to provide a gas turbine in which moving blades can be sufficiently cooled without the use of any special device or special cooling medium, and which produces a lower blade profile loss.

According to the present invention, cooling air supply means is provided for supplying compressed cooling air for cooling moving blades, and heat exchange means for cooling this cooling air is provided at the cooling air supply means. Compressed air, withdrawn from the intermediate-stage portion of the compressor, is used as a cooling medium for the heat exchange means. With this construction, the above object can be achieved. More specifically, the compressed cooling air for cooling the moving blades can be cooled to low temperatures, particularly without changing the configuration of profile of the gas turbine. Therefore, the number of cooling holes formed on the surface of the moving blade can be reduced. As a result, the combustion gas, when passing past the moving blades, is less disturbed by the cooling air, thereby sufficiently reducing a blade profile loss of the moving blades.

DESCRIPTION OF THE PREFERRED EMBODIMENTS OF THE INVENTION

Figure 1:
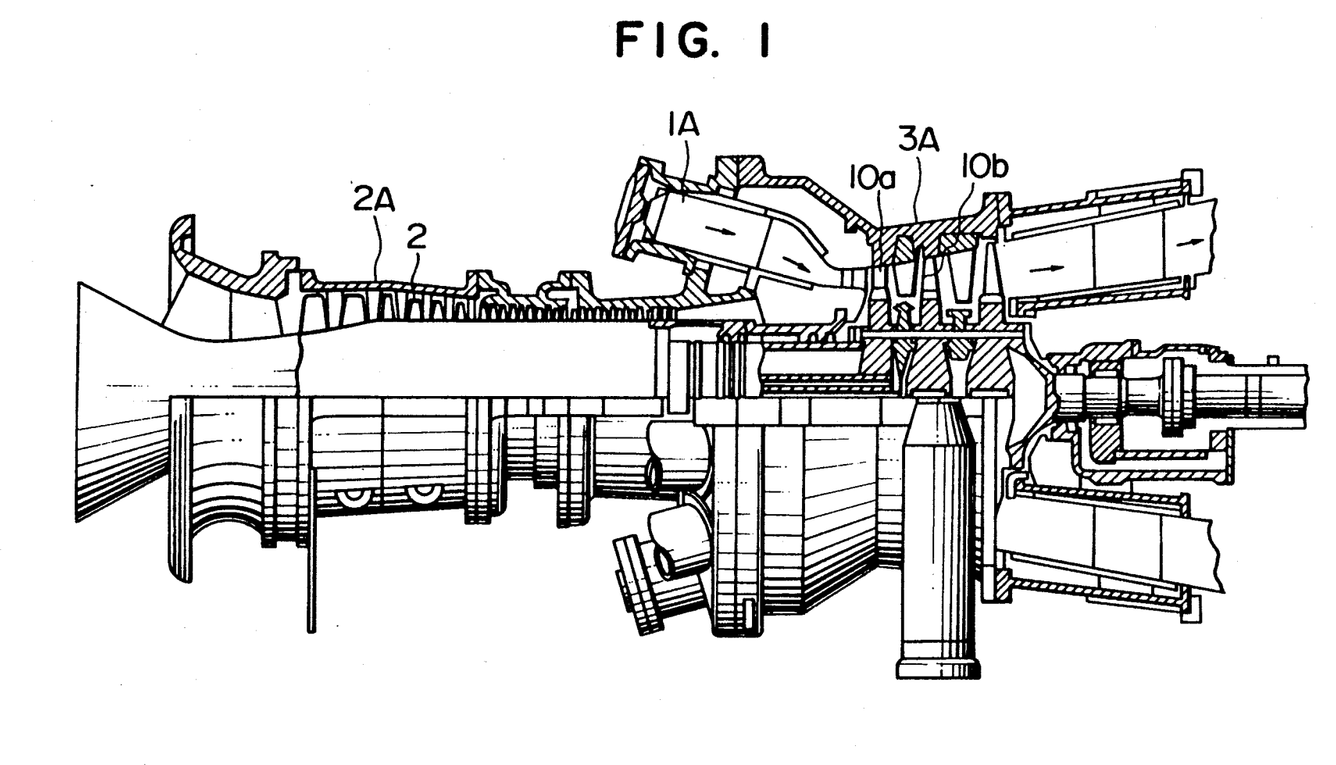
FIG. 1 is a fragmentary cross-sectional, side-elevational view of a gas turbine provided in accordance with an embodiment of the present invention.
Figure 2:
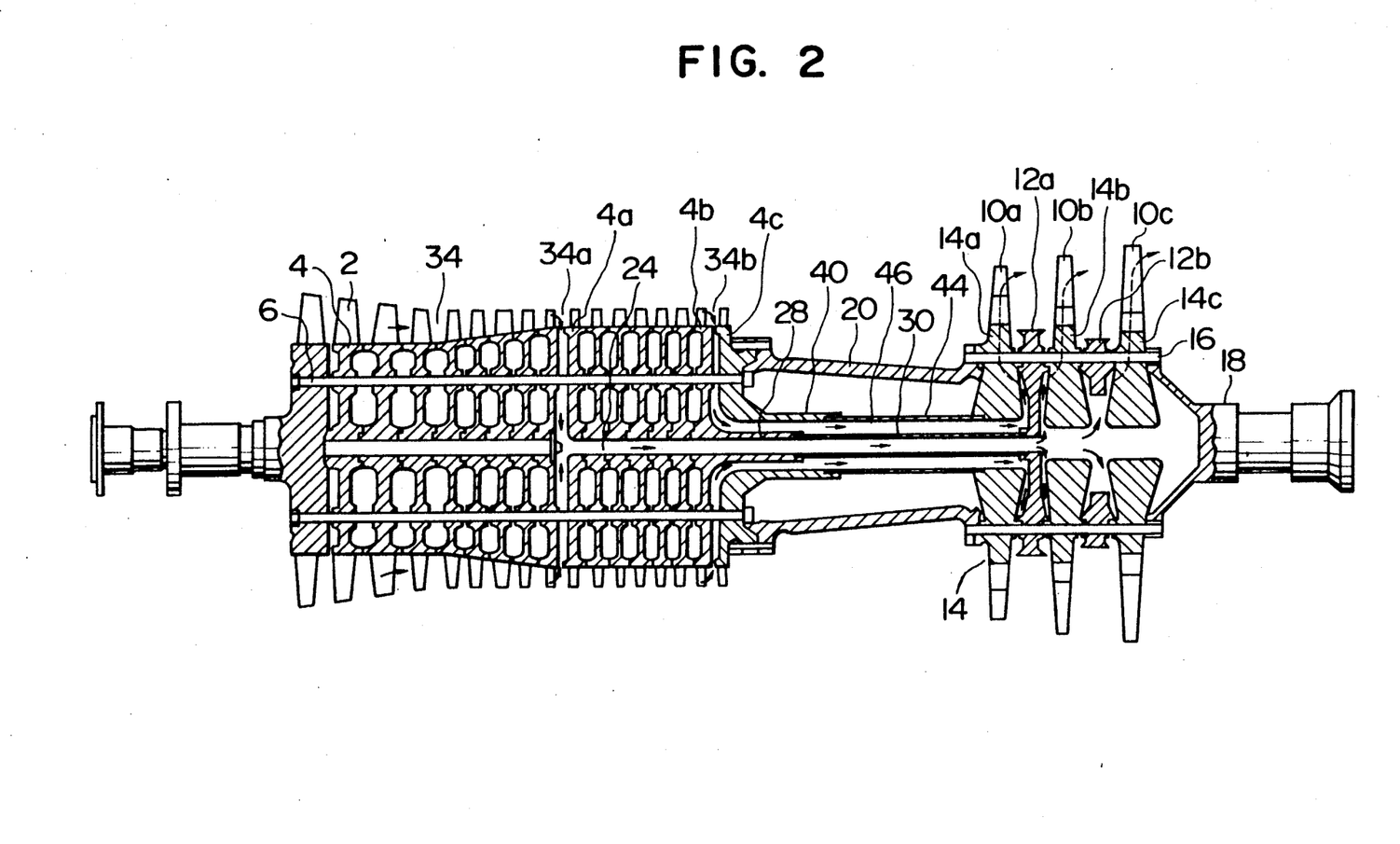
FIG. 2 is a longitudinal cross-sectional view of a rotor of the gas turbine shown in FIG. 1.

FIGS. 1 and 2 show a gas turbine used, for example, for the generation of electricity.

The same parts of this embodiment and other embodiments as those of the above-mentioned gas turbine of FIGS. 4 and 5 are designated by identical reference numerals, respectively, and explanation of such parts will be omitted.

A compressor 2A comprises a plurality of rotation-symmetrical disks 4 each having a number of blades 2 mounted thereon. The plurality of disks 4 are connected together by a plurality of through bolts 6. A turbine 3A is mounted adjacent to the compressor 2A in a coaxial relationship thereto. The turbine 3A comprises three rotation-symmetrical wheels 14 each having a number of cooling blades 10 mounted thereon, and rotation-symmetrical spacers 12 each interposed between respective adjacent wheels 14. The wheels 14 and the spacers 12 are connected together by a plurality of through bolts 16, as is the case with the compressor 2A.

The compressor 2A and the turbine 3A are connected together through a rotation-symmetrical, hollow distance or spacer piece 20, to which the compressor 2A and the turbine 3A are fixedly secured at respective opposite ends thereof.

The intermediate-stage disk 4a of the compressor 2A differs from the other disks 4 in that a bore fan (not shown) is formed in the intermediate-stage disk 4a. The bore fan may, for example, be of the type disclosed in Japanese Patent Unexamined Publication No. 57-2428.

The compressor disk 4a with the bore fan and the other disks 4 are press-fitted together at their central portions to form a laminate construction, and central holes of the disks 4 for a supply passage 24. The disk 4b adjacent to the outlet-stage disk 4c has an extension 28 which extends toward the turbine 3A and has a central bore constituting part of the supply passage 24. The spacer 12a having a central hole is connected to the extension 28 of the disk 4b through a cylinder 30, thus providing the supply passage 24 which also performs the function of a heat exchanger. The opposite ends of the cylinder 30 are respectively connected air-tightly to the spacer 12a and the extension 28.

In the above construction, moving blade-cooling air flows as follows. Namely, part of the main stream of air in an air passage 34 of the compressor 2A is withdrawn via withdrawn ports 34a. The extracted air flows through the passage 24 of the compressor 2A provided in the axial portion of the compressor 2A, through the interior of the cylinder 30, and through a narrow space between the spacer 12a and the second-stage wheel 14b to reach the inlets of cooling air holes adjacent to the dovetails of the second-stage cooling blades 10b. The air flowing through this air passage is used only for cooling the second-stage cooling blades 10b.

The outlet-stage disk 4c of the compressor 2A differs from the other disks 4 in that a bore fan (not shown) is formed in the outlet-stage disk 4c.

The outlet-stage disk 4c has an extension 40 which extends toward the turbine 3A and has a central hole constituting part of a supply passage 46.

The extension 40 and the first-stage wheel 14a of the turbine 3A having a central hole are connected together through a cylinder 44 receiving the cylinder 30 therein. Therefore, the annular portion formed between the cylinder 30 and the cylinder 44 serves as the air supply passage 46 at the outlet portion of the compressor 2A.

The cylinder 44 are connected air-tightly to the compressor disk 4c and the turbine wheel 14a.

The air supply at the outlet of the compressor 2A flows as follows. Namely, part of the main stream of air in the compressed air passage 34 is supply via a withdrawal port 34b. The withdrawn air flows through the cavity portion disposed near the axis of the compressor 2A, through the annular portion forming the air extraction passage 46 between the two concentric cylinders 30 and 44, and further flows through a narrow space between the first-stage wheel 14a and the spacer 12a to reach the inlets of cooling air holes adjacent to the dovetails of the first-stage cooling blades 10a. The air flowing through this passage the is used only for cooling the first-stage cooling blades 10a.

The cylinder 30, disposed axially of the gas turbine and, constitutes the passage, also serves as a heat exchanger for effecting heat exchange between the withdrawn air flowing respectively inside and outside the cylinder 30.

Figure 3:
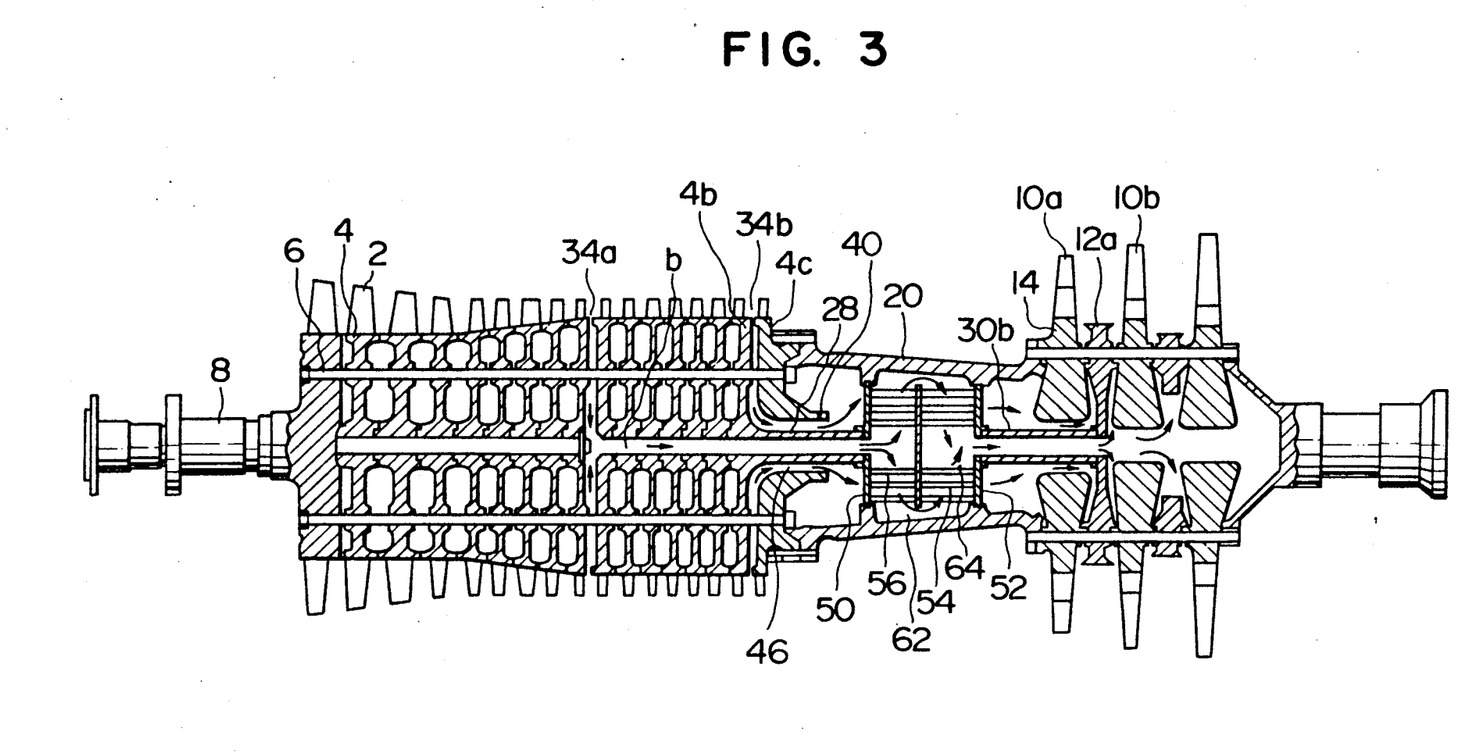
FIG. 3 is a view similar to FIG. 2, but showing a rotor according to another embodiment of the invention.

FIG. 3 shows another embodiment of the invention which is intended to effect such heat exchange positively. A compressor 2A and a turbine 3A of this embodiment are the same as those of the preceding embodiment of FIG. 2. The difference is an internal structure of a distance or spacer piece 20 connecting the compressor 2A to the turbine 3A.

A pair of end plates 50 and 52 having respective central holes are fixedly mounted on the inner wall of the distance or spacer piece 20, and the end plate 50 is disposed close to the compressor 2A while the other end plate 52 is disposed close to the turbine 3A. A baffle plate 54 is provided between the two end plates 50 and 52, and is spaced a predetermined distance from the inner wall of the distance or spacer piece 20. A number of hollow tubes 56 are connected at their opposite ends to the two end plates 50 and 52, and extend through the baffle plate 54. The opposite ends of each tube 56 are connected air-tightly to the end plates 50 and 52, respectively. An extension 28 of a disk 4b, disposed adjacent to an outlet-stage disk 4c of the compressor 2A and having a central bore, is connected air-tightly to the central hole of the end plate 50.

The central hole of the end plate 52 and a central hole of a spacer 12a are connected together through a cylinder 30b in an air-tight manner. The withdrawn air b flowing through the central hole at the stage prior to the outlet stage enters a space 62 provided on one side of the baffle plate 54 disposed close to the compressor 2A, and then flows along the inner wall of the distant piece 20 to a space 64 disposed on the other side of the baffle plate disposed close to the turbine 3A. This withdrawn air further flows through the cylinder 30b, and serves as cooling the air for cooling second-stage cooling blades 10b. On the other hand, the withdrawn air at the outlet-stage flows through an annular portion 46 formed by an extension 40, and then flows through the tubes 56, connected to the end plate 50, into a space defined by the distant piece 20, a wheel 14a, the cylinder 30b and the end plate 52, and serves as cooling air for cooling first-stage cooling blades 10a.

Figure 6:
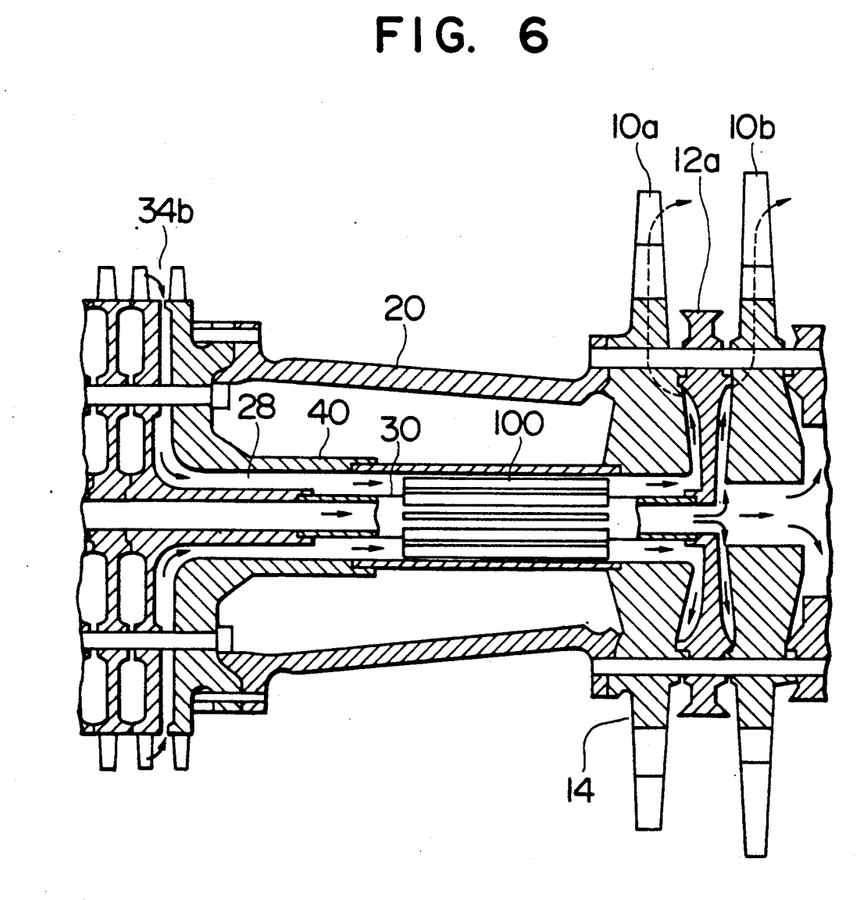
FIGS. 6 and 7 are cross-sectional views of portions of modified rotors of the invention, respectively.

In the embodiment of FIG. 6, in order to promote the heat exchange, a plurality of fins 100 for increasing the heat exchange area are provided on an outer surface of a cylinder 30. With this construction, the efficiency of heat exchanger can be enhanced with a less component parts and with less time and labor, as compared with the preceding embodiments. In other words, the manufacture can be effected more easily.

Figure 7:
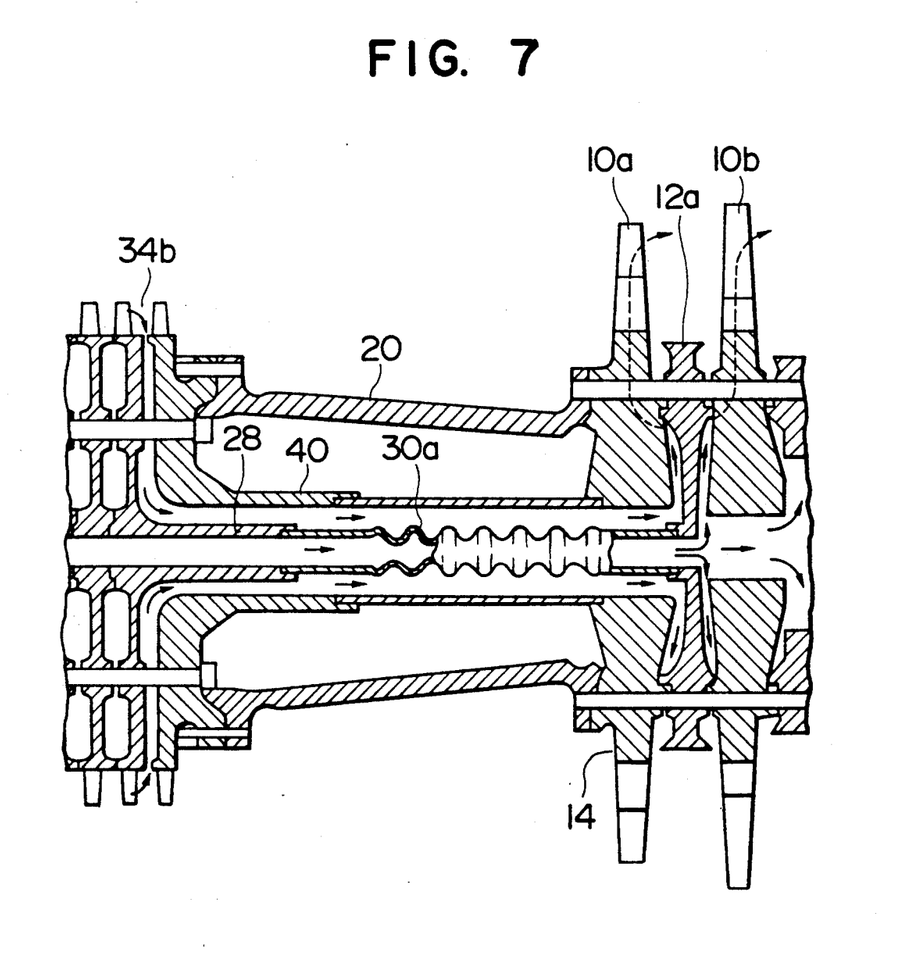

In the embodiment of FIG. 7, a corrugated cylinder 30a is used, and with this construction, also, effects similar to those of the above embodiments can be achieved.

When the invention is applied, for example, to a gas turbine with a rated output of 30 MW, the effect of cooling the first-stage moving blades is as follows.

The cooling air for cooling the first-stage moving blades has a flow rate of 3 kg/S, and a temperature of 366° C., and the cooling air for cooling the second-stage moving blades has a flow rate of 1.5 kg/S, and a temperature of 250° C. Also, when the area of heat transfer of the heat exchanger is 5 m², the cooling air for cooling the first-stage moving blades has a flow rate of 3 kg/S and a temperature of 366° C., and the temperature of the cooling air for cooling the second-stage moving blades becomes 342° C. thus being lowered by about 12° C. When this cooling air is used, the metal temperature of the first-stage moving blades 10a is lowered by about 6° C. on the average, and a creep rupture duration is increased about 1.2 times. The second-stage cooling moving blades originally have a sufficiently long life time, and are hardly affected by the increase in the temperature of the cooling air.

In the above embodiments, the intermediate-stage air withdrawal is effected at the central portion of the compressor, and this withdrawn air cools the second-stage cooling moving blades 10b, and then is discharged to the outside. Therefore, this withdrawn air only needs to be higher in pressure than the gas outside the second-stage cooling moving blades 10b, and in so far as this requirement is met, the air withdrawal stage may be provided at any stage of the compressor.

In case the outer peripheral configuration of the laminated compressor disks 4 is cylindrical at the low pressure-stage portion, and tapered at the intermediate pressure-stage portion, and is again cylindrical at the high pressure-stage portion, as in the embodiment of FIG. 2, preferably the air withdrawal is effected at the junction between the intermediate pressure-stage portion and the high pressure-stage portion. The reason for this is that the compressed air tends to be subjected to separation becomes unstable. Therefore, if the air withdrawal is effected at the above position, unstable turbulence caused by such separation can be somewhat eliminated. This increases the resistance of the compressor to an unstable flow.

In the above embodiments, although the cooling air for cooling the first-stage moving blades is withdrawn the final stage of the compressor, the invention is not limited to such arrangement. For example, the cooling air may be withdrawn from the air discharged from the compressor, as shown in FIG. 8.

Figure 8:
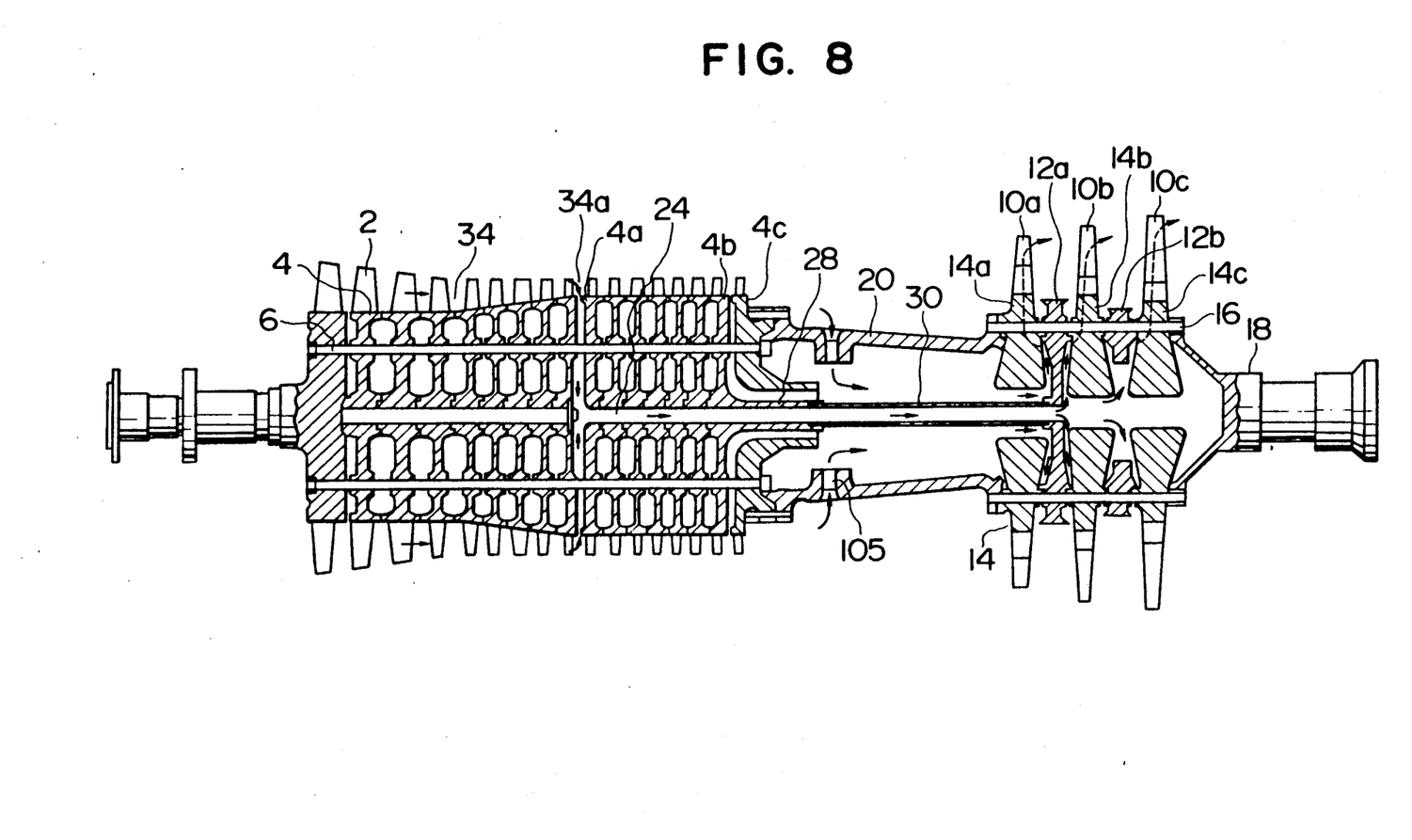
FIGS. 8 and 9 are views similar to FIG. 2, but showing further modified rotors of the invention, respectively.

More specifically, in FIG. 8, a distance or spacer piece 20 interposed between a compressor rotor 2a and a turbine rotor has a peripheral fan 105 provided at the peripheral wall of the distance piece 20, with the peripheral fan 105 having a plurality of openings spaced from one another circumferentially of the distance piece 20. Part of the air discharged from the compressor leaks through a packing gap, and reaches the vicinity of the peripheral fan 105. Then, this leakage air is drawn from the outside of the distance piece 20 into the interior thereof by the rotation of the rotor. The, withdrawn air thus drawn, while effecting heat exchange with the withdrawn air of a relatively low temperature introduced from the central portion of the rotor, comes near to the cooling air inlets for the first-stage moving blades.

The extraction air in this embodiment is higher in pressure than that of the above embodiments, and therefore this construction is particularly useful for first-stage moving blades of the type suffering from increased pressure loss resulting from a complicated cooling construction.

Also, in the above embodiments, although the compressed air withdrawn at the intermediate stage portion of the compressor is supplied to the second-stage moving blades, the invention is not limited to such arrangement. For example, such compressed air may be discharged to an exhaust passage of the gas turbine after the compressed air has made a heat exchange with the compressed air withdrawn at the final stage portion of the compressor.

Figure 9:
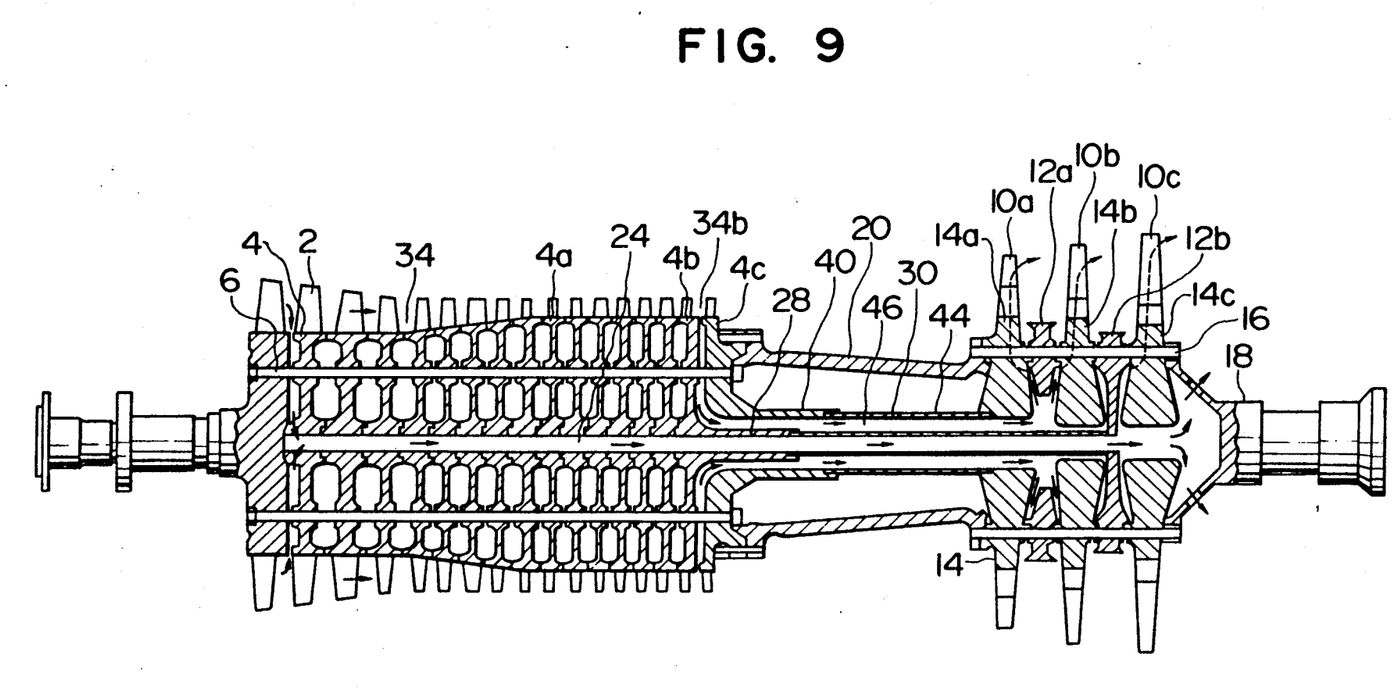

FIG. 9 shows one example of such arrangement, and withdrawn air, of a relatively low temperature is introduced into the interior of a compressor, rotor at the front-stage portion of the compressor. This air passes through the axial central hole of the rotor, and is discharged to the atmosphere from holes in a stub shaft connected to the final stage portion of the turbine. A feature of this embodiment is that since the temperature of the extraction air for effecting heat exchange is low, the extraction air of a relative high temperature for cooling first-stage moving blades 10a can be effectively cooled.

As described above, the air withdrawn at the intermediate stage portion of the compressor may be discharged anywhere, and what is important is to effect heat exchange between the compressed air of high pressure withdrawn at the final stage portion of the compressor and the compressed air (which is lower in pressure and temperature than the former compressed air) extracted at the intermediate stage portion of the compressor.

Because of this heat exchange, the cooling air for cooling the first-stage moving blades and which is required to be maintained at the highest pressure and have high temperature can be lowered in temperature while keeping its pressure at a high level. Therefore, the amount of supply of the cooling air to the first-stage moving blades can be reduced, and hence the number of the cooling holes formed on the surface of each moving blade can be reduced. As a result, the combustion gas, when passing past the moving blades, is less disturbed by the cooling air, thereby sufficiently reducing a blade profile loss of the moving blades.

As described above, in the gas turbines of the present invention, the cooling air supply means is provided for supplying the cooling air for cooling the first-stage moving blades, and the heat exchange means for cooling this cooling air is provided at the cooling air supply means. The compressed air withdrawn at the intermediate stage portion of the compressor is used as a medium for the heat exchange means. With this construction, without the use of any special cooling medium and device, the moving blades liable to become hot can be sufficiently cooled, and therefore the number of the shower cooling holes formed on the surface of each moving blade for cooling the moving blades can be reduced. As a result, the combustion gas, when passing past the moving blades, is less disturbed by the cooling air discharged from the shower cooling holes, thereby a sufficient reduction of a blade profile loss of the moving blades.

What is claimed is:

1. A gas turbine comprising:
   a first stage moving blade arranged on a rotating shaft of said gas turbine and adapted to be driven by gas discharged from a combustor, said first stage moving blade having cooling holes formed on a surface thereof;

a rear stage moving blade arranged on a rotating shaft of said gas turbine downstream of said first stage moving blade and having cooling holes formed on the surface thereof, said rear stage moving blade being adapted to be driven by gas discharged from the combustor;

a compressor adapted to be driven by the driving of said first and second stage moving blades to produce compressed air for combustion and cooling;

cooling air supply means having a first port provided on a rear stage side of said compressor and through which a part of said compressed air from said compressor is withdrawn, and wherein air withdrawn through said first port is supplied to the cooling holes of said first stage moving blade to cool the same;

heat exchange means provided on said cooling air supply means for cooling air supplied to said first stage moving blade; and cooling medium supply means having a second port provided on a front stage side of said compressor and through which a part of compressed air from said compressor is withdrawn, and wherein air withdrawn through said second port is supplied to said heat exchange means as a cooling medium for said heat exchange means, and wherein said cooling medium, after passing through said heat exchange means, is supplied to the cooling holes of said rear stage moving blade for cooling the same.

2. A gas turbine according to claim 1 wherein said heat exchange means is disposed on an axis of rotation of said rotating shaft between said compressor and said first stage moving blade.

3. A gas turbine according to claim 1, wherein said heat exchange means comprises coaxially disposed dual passages, of which an inner passage allows said cooling medium to flow therethrough.

4. A gas turbine as set forth in claim 1, wherein air withdrawn through said second port passes through an interior of said rotating shaft to be supplied to said heat exchange means and again passes through an interior of said rotating shaft to be supplied to said rear stage moving blade.

5. A gas turbine as set forth in claim 1, wherein said first port is provided on a final stage of the compressor.

* * * * *